United States Patent von Medlin

Patent Number: 5,269,919
Date of Patent: Dec. 14, 1993

[54] SELF-CONTAINED WATER TREATMENT SYSTEM

[76] Inventor: Wallace von Medlin, 20600 Henwood Rd., San Jose, Calif. 95120

[21] Appl. No.: 822,360

[22] Filed: Jan. 17, 1992

[51] Int. Cl.$^5$ .............. C02F 9/00; C02F 1/70; B01D 27/02

[52] U.S. Cl. .................. 210/256; 210/262; 210/266; 210/282; 210/284; 210/291; 210/288; 210/285; 210/295; 210/315; 210/912; 210/914; 210/669; 210/321.83; 210/638; 210/501

[58] Field of Search .............. 210/266, 282, 284, 202, 210/259, 295, 260, 261, 262, 501, 688, 638, 683, 502.1, 500.1, 291, 319, 912, 914, 757, 663, 669, 315, 288, 285, 256

[56] References Cited

U.S. PATENT DOCUMENTS

| | | | |
|---|---|---|---|
| 3,817,860 | 6/1974 | Lambert | 210/501 |
| 3,923,665 | 12/1975 | Lambert | 210/501 |
| 4,026,978 | 5/1977 | Mungle et al. | 264/41 |
| 4,145,291 | 3/1979 | Console | 210/501 |
| 4,202,770 | 5/1980 | Gappa | 210/291 |
| 4,238,477 | 12/1980 | Lambert | 210/501 |
| 4,460,467 | 7/1984 | Ueda | 210/291 |
| 4,540,489 | 9/1985 | Burnaud | 210/501 |
| 4,642,192 | 2/1987 | Heskett | 210/757 |
| 4,681,677 | 7/1987 | Kuh | 210/266 |
| 4,711,723 | 12/1987 | Bray | 210/652 |
| 4,713,175 | 12/1987 | Bray | 210/266 |
| 4,717,476 | 1/1988 | Scott | 210/266 |
| 4,759,844 | 7/1988 | Lipschultz | 210/266 |
| 4,769,143 | 9/1988 | Deutsch | 210/266 |
| 4,800,018 | 1/1989 | Moser | 210/266 |
| 4,808,287 | 2/1989 | Hark | 210/266 |
| 4,830,744 | 5/1989 | Burrows | 210/257.2 |
| 4,877,521 | 10/1989 | Petrucci | 210/282 |
| 4,897,187 | 1/1990 | Rice | 210/266 |
| 4,911,840 | 3/1990 | Underwood | 210/266 |
| 4,936,985 | 6/1990 | Hahn | 210/266 |
| 4,995,976 | 2/1991 | Vermes | 210/282 |
| 5,004,535 | 4/1991 | Bosko et al. | 210/90 |
| 5,006,245 | 4/1991 | Yukishita | 210/284 |
| 5,008,011 | 4/1991 | Underwood | 210/282 |
| 5,017,284 | 5/1991 | Miller | 210/195.2 |
| 5,032,268 | 7/1991 | Hahn | 210/256 |
| 5,037,547 | 8/1991 | Burrows | 210/266 |
| 5,061,367 | 10/1991 | Hatch | 210/266 |
| 5,064,534 | 11/1991 | Busch | 210/266 |
| 5,078,864 | 1/1992 | Whittier | 210/259 |
| 5,092,993 | 3/1992 | Goodwin | 210/757 |
| 5,122,274 | 6/1992 | Heskett | 210/638 |

FOREIGN PATENT DOCUMENTS

| | | | |
|---|---|---|---|
| 2826631 | 1/1980 | Fed. Rep. of Germany | 210/291 |
| 1-022394 | 1/1989 | Japan | 210/266 |
| 567465 | 8/1977 | U.S.S.R. | 210/282 |
| 1688 | 3/1987 | World Int. Prop. O. | 210/282 |

OTHER PUBLICATIONS

Montemarano, Jay, "Demand-Release Polyiodide Disinfectants", Water Technology, Aug. 1990.

Stenger, Larry, et al., "Using An Alloy To Remove Metals . . . and More", Water Conditioning & Purification Magazine, Jun. 1990.

*Primary Examiner*—Thomas M. Lithgow
*Attorney, Agent, or Firm*—Heller, Ehrman, White & McAuliffe

[57] ABSTRACT

A water purifying system including two or more stages for removing organic and inorganic contaminants from source water. The system may be configured such that water is first passed through a biocidal resin, and then through a granular metal alloy and an activated carbon filter to remove iodides released into the water by the biocidal resin. The granular metal alloy may be agitated by turbulent motion as the water treated.

11 Claims, 7 Drawing Sheets

SELF-CONTAINED WATER TREATMENT SYSTEM

The present invention relates in general to point-of-use filtration or purification of water for human consumption. The invention relates in particular to filtering or purification of water which may be microbiologically unsafe.

The deterioration in the quality of water for human consumption has become a major world concern. Among water contaminants that have come to light are harmful waterborne Gram-negative bacteria, viruses, and parasites. These may include, for example, *vibrio cholera, escherichia coli, klebsiella terrigena, pseudoNonas kingii, legionella pneumophila,* and stereotypes of *salmonella enteritidis*. Source water may also contain dissolved salts and minerals such as lead, fluoride, cadmium, sodium, arsenic, selenium, asbestos, nitrates, and aluminum. The presence of sodium in the tap water is of particular concern to individuals on a restricted sodium diet. Other objectionable substances commonly found in tap water are organic compounds such as pesticides, herbicides, plastics, solvents, and fertilizers, which have been identified as being carcinogenic. The continued ingestion of the inorganic heavy metals such as lead can result in lead poisoning, and other health problems, particularly in children and pregnant women.

In regions such as rural areas and in the underdeveloped countries of the world, means of treating water to make it potable for human consumption and free from the many harmful waterborne bacteria and viral contaminations are not readily available. In such regions viral contaminations such as cholera, hepatitis, and Legionnaire's disease are an increasing concern. In addition, many other maladies are being linked to the many highly toxic substances found in drinking water globally. The dangers raised by these concerns have brought on such measures as boiling, processing, and bottling water for drinking purposes, but this is relatively expensive, ineffective, cumbersome and often an incomplete solution to the overall larger problem.

Among the prior art methods and apparatus for filtering water are reverse osmosis (RO) filter systems and activated carbon systems. A conventional reverse osmosis system employs a semi-permeable membrane which removes certain dissolved salts and minerals as well as selenium carried by the water. Activated carbon is used for removing certain organic compounds in the water and to improve its taste. However, if the source water happens to be microbiologically unsafe, then the granular activated carbon (GAC) or block carbon can become a breeding ground for these harmful bacteria. Heretofore water filter systems have been provided in which a reverse osmosis unit is used in combination with an activated carbon unit, but requiring known potable water for treatment only. Reverse osmosis membranes are configured in two basic types. One type will tolerate chlorine in the water as a bactericidal agent. This type, however, is relatively inefficient and produces less product or purified water per unit membrane area than a second type which includes what is known as "thin film" membrane material. This second type is highly efficient but cannot tolerate chlorine.

Reverse osmosis systems designers have heretofore been hampered, for example, by having to specify one type of reverse osmosis membrane for use on a typical well water source, and a different type of membrane for use with municipally supplied water which is chlorinated.

Heavy metals, chlorine, and other salts may be removed from water by passing it over a granulated metal alloy material for example, an alloy including pure copper and pure zinc. Such a material is sometimes referred to as "redox" material. Mechanisms of the removal process are described in a paper "Using An Alloy To Remove Metals and More", by L. Stenger, et al., in *Water Conditioning*, June 1990. A problem with such granulated metal alloy material appears to be that it may rapidly compact when used with heavily contaminated water. Compaction occurs when material adsorbed onto granules acts as an adhesive binding granules together and reducing the surface area of the granular metal alloy material available for water treatment. As such, the material may need to be frequently changed or means must be provided for recirculating water through the material to make up for reduced effectiveness.

Treatment of biologically contaminated water may be effected by using a ceramic filter or a biocidal agent. A ceramic filter operates by filtering bacteria from source water. Ceramic material in the filter may have a pore size of about one micron, small enough to filter out most known harmful bacteria. Such a ceramic material is available from Performance Filters, Inc. of Cincinnati, Ohio. A ceramic filter, however, may not be effective against viral contaminants.

A biocidal agent effective in removing both bacterial and viral contamination is a polyiodide material, preferably a pentaiodide material. Such a material is described in a paper "Demand-Release Polyiodide Disinfectants" by J. Montemarano, *Water Technology*, August 1990, pp. 65-66. The pentaiodide material is contained in a resin and is only released from the resin on contact with microorganisms. While very effective against both bacteria and viruses, pentaiodide resin has the disadvantage that iodides are released into water after it is treated. It is believed that excess iodine in water may have harmful effects on a consumer. As such, it would be advantageous to develop a method to remove or at least reduce residual iodine in water that is treated with a polyiodide disinfectant.

In view of the foregoing it would appear that a water purification system effective against most known types of contamination is generally relatively complicated and expensive to install, and not readily adapted for point-of-use installation by a consumer or homeowner. Inclusion of a biocidal capability in such a system may add to the expense and complication. As such, a biocidal capability is preferably only included in a system when it is used with water which is known or suspected to be biologically contaminated.

It is therefore an object of the present invention to provide a water filtering or purification system to treat microbiologically safe tap water with an optional turbidity biocidal system to treat microbiologically unsafe water.

It is another object of the present invention to provide a biocidal water purification system which does not produce unacceptable levels of iodides in water treated with the system.

It is yet another object of the present invention to provide a filtering or purification system wherein a high efficiency reverse osmosis membrane may be used with a chlorinated water source.

It is still another object of the present invention to provide a self-contained water filter system which can be readily installed by a consumer.

It is a further object of the present invention to provide a self-contained water filter system which may be installed on a water tap and may continuously operate to filter contaminants from the water while producing a stream of potable water.

SUMMARY OF THE INVENTION

The present invention is directed to a system for treating water to remove suspended and dissolved contaminants including sediments, heavy metals, salts, and organic materials. The system is designed to have an optional biocidal capability for removing waterborne biological contaminants such as bacteria, parasites, and viruses. The system is arranged such that the biocidal capability can be added or removed without disconnecting or dismantling the system.

The system includes means for receiving water for treatment and at least two treatment or filtering stages. A first stage includes granular metal alloy for treating water, and means for agitating the granular metal alloy during treatment. Water is delivered to a second stage after treatment. The second stage includes a filter for filtering water treated in the first stage, and an output for delivering water from the system.

The second stage filter may include activated carbon in granular or block form. In one arrangement of the second stage, filtered water is passed through a reverse osmosis filter and then through granular activated carbon. The reverse osmosis filter may be provided with a brine removal system for removing brine rejected thereby. The brine removed may be collected and recirculated through the system for reducing water loss.

A biocidal treatment unit may include a biocidal resin including a polyiodide, preferably a pentaiodide. Water is passed through the biocidal treatment stage before it is passed through the first stage. As such, iodide released into the water by the biocidal resin is removed from the water by the granular metal alloy material and by the activated carbon.

One embodiment of the invention includes a one piece molded coupling unit having a first attachment point for a first treatment unit including at least granular metal alloy and activated carbon stages in a single housing, and a second attachment point for a second treatment unit including a biocidal resin. The coupling unit includes an input port for receiving source water to be treated, and first and second internal conduits. The first conduit flows water from the input port to the second attachment point and the second conduit flows water from the second attachment point to the first attachment point, for input into the first treatment unit. When a second treatment unit is not attached to the second attachment point, the second attachment point may be sealed with a cap. The cap is configured to divert source water from the first conduit directly into the second conduit for input into the first treatment unit.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

The present invention will be described in terms of systems for treating water. Water treatment may include filtering to remove suspended solids and purifying for removing dissolved contaminants, particularly biological contaminants. From time to time the term "filtering" may be used to include both removal of suspended material, dissolved and biological contaminants. The term "source water" may be used to designate water which may be available from a domestic or municipal supply, or water which may be brought to a system from a natural water supply such as a well, a stream or a lake.

Figure 1:
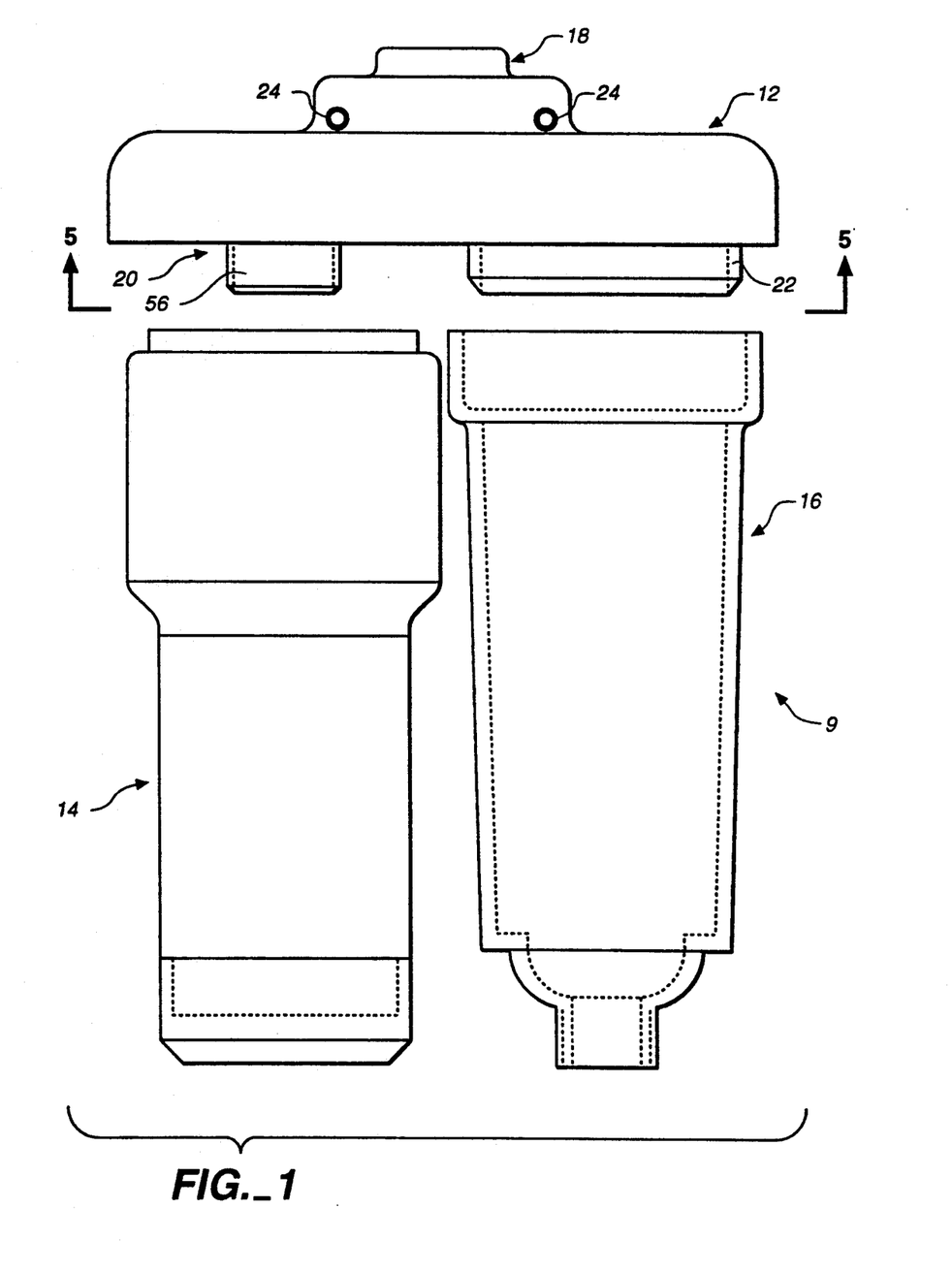
FIG. 1 is a schematic exploded view showing a filtering system of the present invention including a coupling unit and two water treatment units which may be mounted on the coupling unit.

Referring now to the drawings, wherein like components are designated by like reference numerals, FIG. 1 illustrates one preferred embodiment of the present invention. Here a filter system, designated generally by the numeral 9, may include a mounting or coupling unit 12, a first treatment unit 14 and a second treatment unit 16. Coupling unit 12 includes an input port 18, a first attachment point 20 for treatment unit 14, and a second attachment point 22 for treatment unit 16. Such a system may be mounted directly on a faucet using a suitable adapter (not shown) at input port 18, or may be connected to a faucet or like water source by a pipe or tube (not shown). Mounting points 24 may be provided for mounting the system on a wall or fixture. It is important that water be delivered under pressure to port 18, as it is this pressure which is used to urge source water through various filtering and purifying stages which are described in detail below. Generally a domestic or municipal water supply providing water at a pressure of between about thirty and one hundred pounds per square inch (p.s.i) is sufficient for effective operation.

Figures 2, 2A:
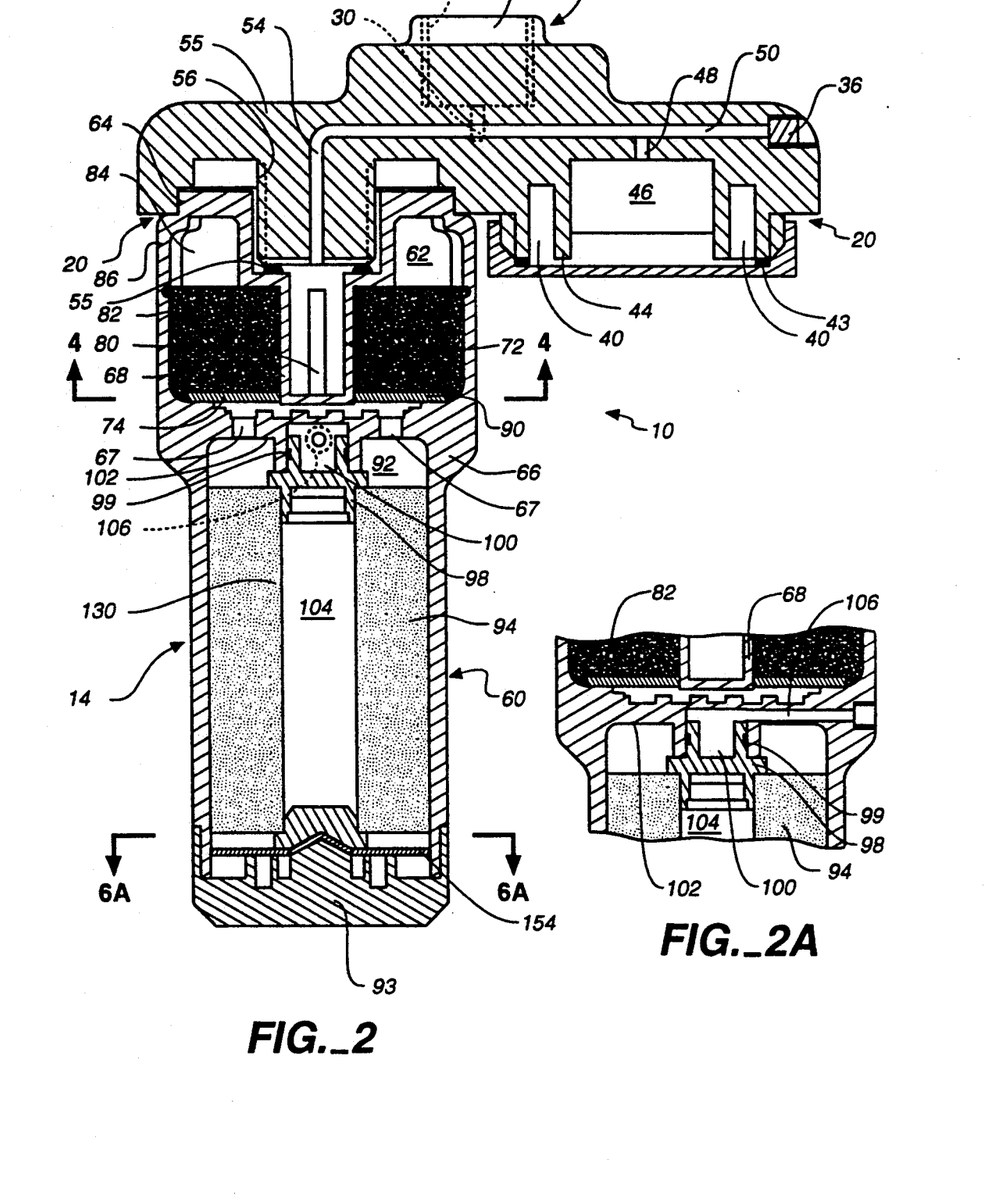
FIG. 2 is a cross-sectional view schematically illustrating the coupling unit of FIG. 1 with one water treatment unit attached thereto, and a cap for sealing an attachment point for a second water treatment unit.
FIG. 2a illustrates details of a bore for extracting filtered water from the system of FIG. 1.
Figure 4:
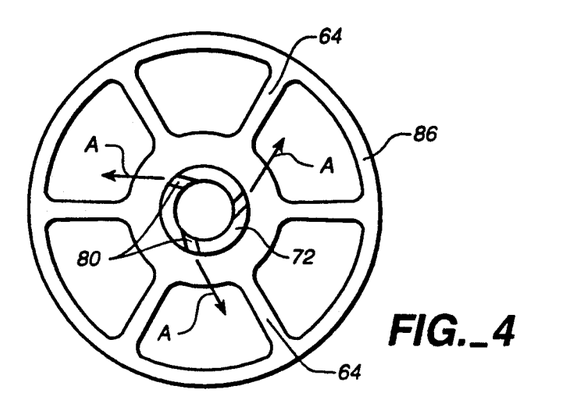
FIG. 4 is a plan view taken along line 4—4 of FIG. 2 schematically illustrating an arrangement of slots and fins for causing agitation of granular metal alloy filter material.
Figure 5:
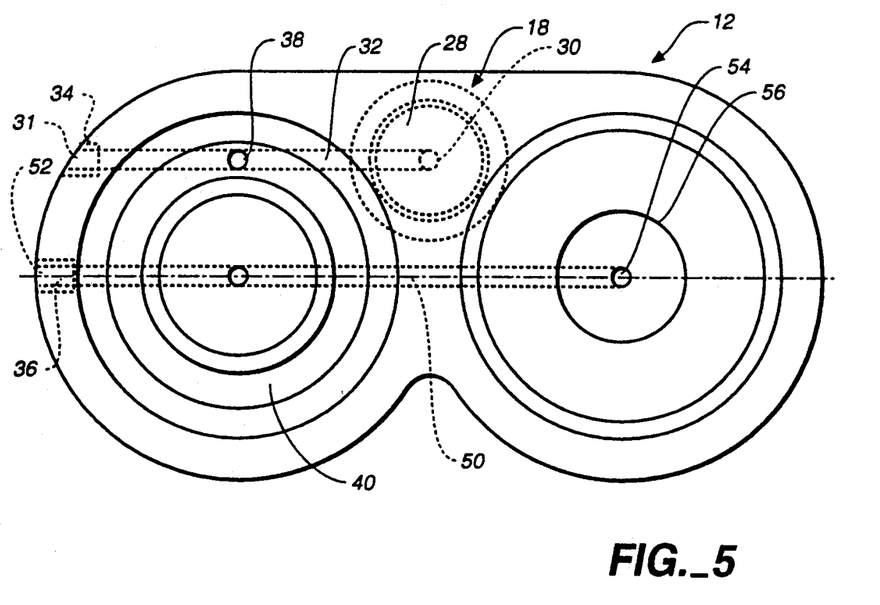
FIG. 5 is a plan view taken along line 5—5 of FIG. 1 schematically illustrating an arrangement of conduits in the coupling unit.

As shown in more detail in FIGS. 2, 4, and 5, input port 18 of coupling unit 12 includes a bore 26 having a diameter which preferably corresponds to the diameter of common domestic water faucets. A threaded section 28 may be provided for attaching the unit to a faucet or an adapter therefor. A smaller bore 30 connects input port 18 with a conduit 32 (See FIG. 5). Conduit 32 may be bored into the coupling unit from a peripheral point 34 providing access for cleaning. The conduit may be sealed at point 34 by a plug 36 when the system is in use. Conduit 32 is connected by a bore 38 to an annular groove 40 in attachment point 22. Bore 30, conduit 32, and bore 38 establish a fluid connection for fluid communication between input port 18 and attachment point 22. A cap 42 and a flat seal 43 are provided for sealing attachment point 22 when no treatment unit is attached thereto. Cap 42 is configured such that water entering groove 40 may flow around wall 44 into central space 46. A bore 48 connects space 46 with a conduit 50. Conduit 50 may be bored into coupling unit 12 from peripheral point 52 and sealed in the same manner as conduit 32. Conduit 50 is connected to a bore 54 in a spigot 56 for delivering water to treatment unit 14 attached thereto. Bore 48, conduit 50, and bore 54 establish fluid communication between attachment point 22 and attachment point 20. As such, when no treatment unit is attached to attachment point 22 and with cap 42 in place, water input through port 18 may be directed to treatment unit 14 for treatment.

Treatment unit 14 comprises a generally cylindrical housing 60. Within housing 60 is an upper chamber 62 having a top 64 and a base 66. Base 66 includes ports 67 for flowing water out of chamber 62. Chamber 62 contains granular metal alloy material for treating water to remove, for example, heavy metals such as lead, arsenic, and mercury, or inorganic materials such as chlorine, fluorides, and iodides. The granular metal alloy metal is available for example under the trade name "KDF" from KDF Fluid Treatment, Inc. of Constantine, Mich. KDF is a granular cooper-zinc alloy including about sixty percent copper and a thirty-five percent zinc. It is described in detail in U.S. Pat. No. 4,642,192. Chamber 62 includes a tubular input member 68 for delivering water to treatment unit 14. Input member 68 includes an upper portion 70 attached to top 64 of chamber 62. Upper portion 70 may be threaded for attachment to spigot 56. A flat seal 55 is provided for sealing treatment unit 14 to spigot 56. Input system 68 includes a lower portion 72 in fluid connection or communication with upper portion 72 and sealed at a base 74. Water from bore 54 of spigot 56 enters lower portion 72 and is delivered through angled slots 80 therein into chamber 62 (See FIGS. 2 and 4). Water is delivered through slots 80 generally in the direction indicated by arrows A. Granular metal alloy material is contained in chamber 62. Water emerging from slots 80 tends to move material around chamber 80 in a circular motion. Fins extending radially between upper portion 70 of input unit 68 and cylindrical wall 86 of housing 60 (chamber 62) tend to impede the circular motion causing a turbulent flow in chamber 62 which agitates granular metal alloy material 82. Agitating the granular metal alloy material using a turbulent flow action is effective in preventing granules thereof from compacting, increasing the area of metal alloy surface to which the water is exposed. Turbulent flow also provides an extended contact time between water and the granular metal alloy. Preferably three slots 80 and six fins 84, as shown in FIG. 4, are provided. It will be evident, however, that as few as one slot or fin, or more than three slots or six fins may be effective to some extent. Granular metal alloy material may be supported in chamber 62 on a disc 90 of a porous material such as "Porex", available from Porex Technologies of Fairburn, Ga. This support arrangement is effective in preventing metal alloy granules from blocking ports 67.

Granular metal alloy treated water passes through ports 67 into a lower chamber 92 within housing 60. Chamber 92 is arranged generally coaxially with chamber 62. In one embodiment, chamber 92 may include a hollow cylindrical block 94 of activated carbon. Block 94 is preferably arranged generally coaxially in chamber 92. Block 94 may be provided at one end with a solid sealing plug 96, and at the other end a with an open cylindrical adapter 98 including an "O" ring seal 99, which is inserted into a cylindrical receiving portion 100 in top 102 of chamber 92. As such, carbon block 94 effectively encloses a cylindrical subchamber 104 within chamber 92. Thus, water entering chamber 92 through ports 67 is forced to pass through carbon block 94 to enter subchamber 104. Treated water is extracted or output from subchamber 104 via a port 106 which is bored radially through base 66 to penetrate cylindrical receiving unit 100 (See FIG. 2a).

The above described system includes two stages of filtering, i.e., a granular metal alloy stage including agitation of the granular metal alloy material, followed by an active carbon filtering stage for filtering or eliminating organic contaminants, for example trichloroethylene (TCE) and polychlorinated biphenyls (PCB). A coupling unit 12 has been described which includes an attachment point for attaching a second treatment unit which may include at least a biocidal capability for removing biological contaminants.

It has been determined that both granular metal alloy material, and activated carbon, are effective in removing iodides from water. As such, a biocidal treatment including polyiodide resin, followed by a granular metal alloy treatment or activated carbon treatment can be used in a system to provide both bacteriological and viral purification without leaving unacceptable residual iodides in water treated therewith. When both granular metal alloy treatment and carbon filtration is used, iodides may be essentially eliminated from the water. The coupling unit 12 allows this biocidal capability to be added or removed, as required, at second attachment point 22. When thus attached, the biocidal treatment will be effected before water enters a unit, including a granular metal alloy and carbon, attached to the first attachment point. A biocidal capability may thus be added or removed to the system without dismantling or detaching any unit already attached. It will be evident that should a biocidal capability not be required, treatment unit 14 may be attached directly to a water source.

Figure 3:
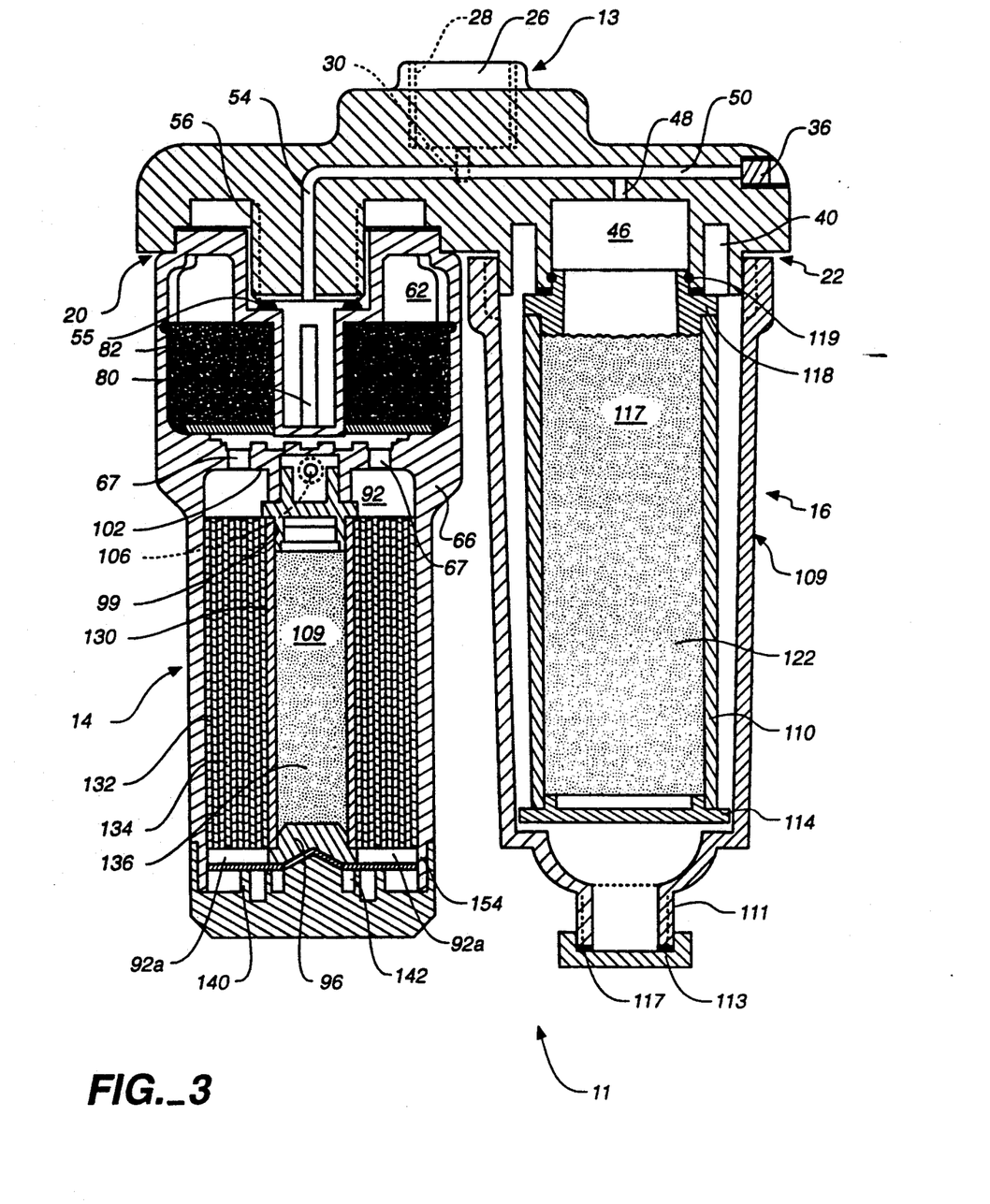
FIG. 3 is a cross-section view schematically illustrating the coupling unit of FIG. 1 with two water treatment attached thereto.
Figure 3A:
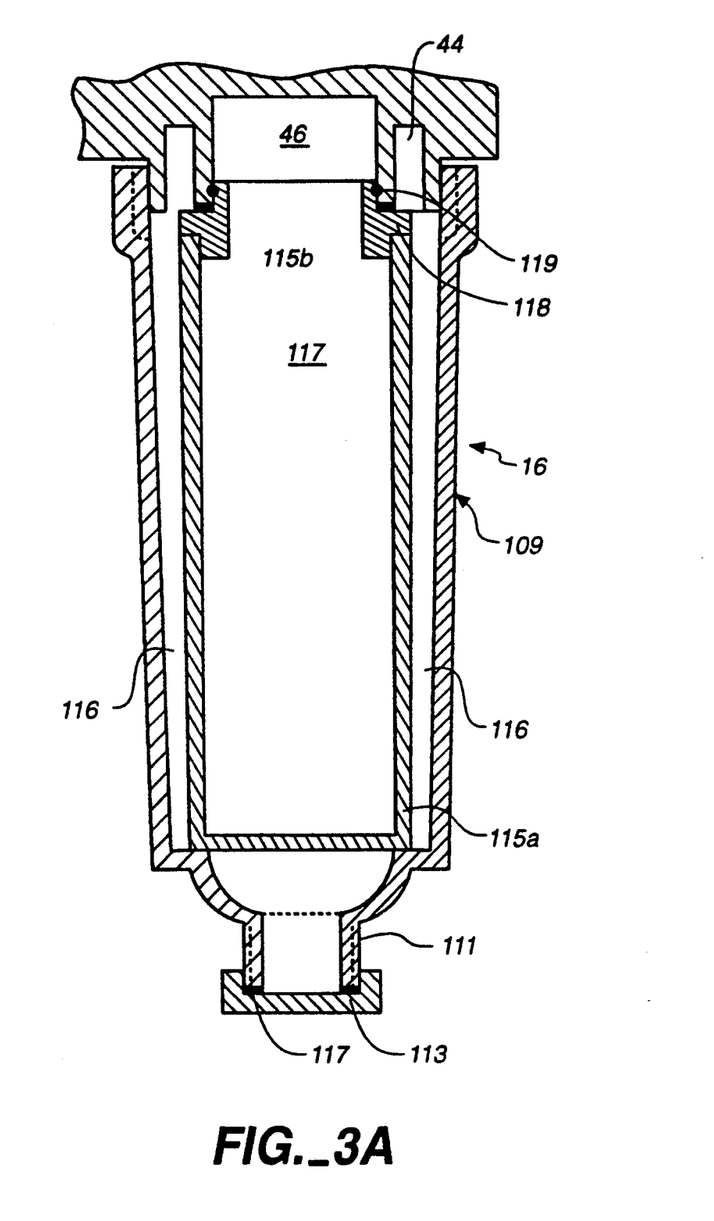
FIG. 3a illustrates a treatment unit for the system of FIG. 1 including a ceramic filter.

Turning now to FIG. 3 for details, a system 11 including a second treatment unit for removing biological contaminants from water is shown. Sealing cap 42 of system 10 (FIG. 2) is not attached. Treatment unit 16 is attached to second attachment point 22. Treatment unit 16 includes a housing 109 having a turbidity/biocidal filter cartridge 110 therein. Cartridge 110 comprises a cylinder 112 of a porous material such as Porex, a solid plug 114 for closing one end of the cylinder and an open adapter 118 including an "O" ring seal 119 for sealing cylinder 112 to cylindrical wall 44. As such, cylinder 112, plug 114, and adapter 118 may be regarded as dividing housing 109 into a generally annular outer subchamber 116 and an inner subchamber 117, coaxial therewith. Inner subchamber 117 contains a filter material 122 for removing at least bactericidal contaminant water and preferably also viral contaminants. Filter material 122 is preferably a polyiodide resin such as "Penta-Pure", a pentaiodide resin available from Water Technologies Corporation of Plymouth, Minnesota. Housing 109 includes a port 111 having a flat seal 117 and a removable sealing cap 114, to allow turbidity filter residues to be periodically flushed from subchamber 116. Bacteria may be removed from water by means of a filter including a ceramic material having a pore size of about one micron. A ceramic filter may be effective in filtering out most common bacteria, but may be ineffective in removing bacteria. Turning now to FIG. 3a, one arrangement of a ceramic filter in treatment unit 116 is shown. Here, the ceramic material is in the form of a cylinder having a closed lower end 115 and an open upper end 115b. Open end 115b is connected to space 46 in attachment point 22 by an open adapter 118 and an "O" ring seal 119.

Referring again to FIG. 3, water input through port 18 flows via bore 28, conduit 32 and bore 38 through annular channel 44 into subchamber 116. The water passes through porous cylinder 112 which may be effective in reducing water turbidity. Turbidity is a term applied to suspended biological inorganic and organic particles in water which may be in sufficient amount to make the water seem cloudy. After passing through cylinder 112 water rises through biocidal filter material 122 in subchamber 117 into space 46. Input pressure urges the water from space 46, through bore 48, via conduit 50 and bore 54, to be delivered to treatment unit 14 for further treatment.

Treatment unit 14 includes a subchamber 62 including granulated metal alloy filter material and means for agitating the filter material. The water is treated in chamber 62 as described above to remove, for example heavy metals and chlorine and any iodides present or released in to the water by biocidal filter material 122. Granulated metal alloy treated water passes through ports 67 into chamber 92. Chamber 92 includes a hollow cylindrical core 130 of a porous material. Core 130 is sealed at one end by a solid plug 36 and at the other end by an open adapter 98 which is inserted into a cylindrical receiving portion 100 in top 102 of chamber 92. Core 130 effectively encloses a cylindrical subchamber 104 within chamber 92 and forms an outer annular subchamber 92a within chamber 92. As such, cylindrical chamber 62, chamber 92, subchamber 92a and subchamber 104 are generally coaxial. Subchamber 92a may be at least partially filled by a reverse osmosis filter. Such a filter is known to be effective in removing dissolved contaminants such as arsenic, cadmium, lead, mercuric nitrate, and suspended particulate matter. Such a filter is preferably constructed from a plurality of layers of a membrane material, preferably a thin-film composite material made with a polyamide based polymer separated by layers of a porous material. This type of reverse osmosis filter is known as a spiral-wound filter. Polyamide-based polymer membrane material is available from Purification Products, Inc. of San Marcos, Calif. The layers may be wrapped conveniently around core 130. Subchamber 104 contains granular activated carbon 136. Water entering chamber 92 through ports 67 is forced to pass through reverse osmosis membrane layers 132 before passing through porous core 130 into subchamber 104. Water rises through carbon granules 136 and through open adapter 98 to be output through port 106.

Figure 6A:
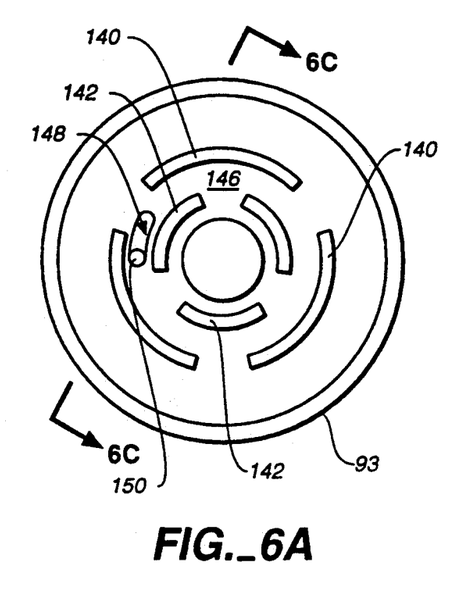
FIG. 6a is a plan view taken along line 6a—6a of FIG. 2 schematically illustrating an arrangement of concentric ribs in the base of a filter chamber.
Figure 6B:
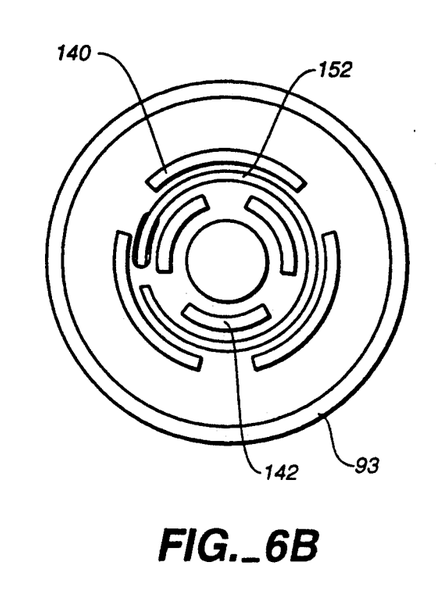
FIG. 6b is a view like FIG. 6a but including a catheter tube for removing brine rejected by a reverse osmosis filter.
Figure 6C:
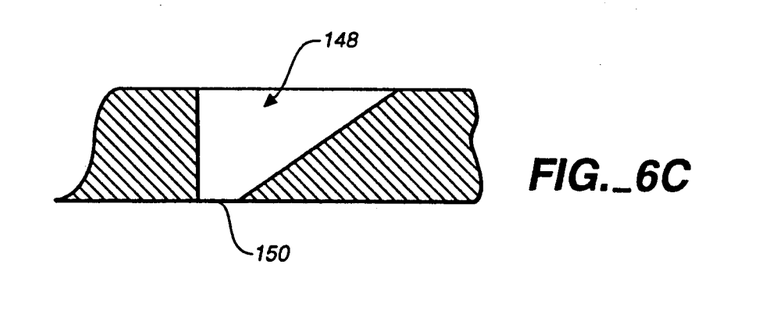
FIG. 6c is a cross-sectional view, along line 6c—6c of FIG. 6a, illustrating one form of a slot for inserting the catheter tube of into the base.

A reverse osmosis filter is effective in reducing levels of dissolved contaminants which would pass through conventional filter material. As such, a reverse osmosis filter rejects a liquid residue richer in dissolved contaminants than the filtrate which it passes. The rejected liquid may be conveniently referred to as brine. In order for a reverse osmosis filter to function effectively, means must be provided to continually remove rejected brine. Selecting an optimum removal ratio of rejected brine removed to filtrate passed is important in establishing a balance between filter throughput and filtering effectiveness. Turning again to FIG. 3, and to FIGS. 6a–c, one arrangement for removing, at a controlled predetermined rate, brine rejected by reverse osmosis membrane 132 is illustrated. As shown, base 93 includes concentric curved-rib members 140 and 142 defining a generally circular space 146 therebetween. Within space 146, base 93 is penetrated by an aperture 150 at the base of an angled slot 148. A length of tubing 152, preferably of a fluorinated hydrocarbon polymer, is inserted through aperture 150 and sealed therein. The length of tubing is coiled around space 146. This method of brine extraction may be referred to as catheter extraction. The tubing (catheter) length is selected to remove brine at a predetermined controlled rate. For example, a ratio of five parts brine removed to one part water passed has been found acceptable. For systems having a pure water output between about forty and four gallons per day, this ratio may be achieved, for example, using tubing having a bore of 0.032 inches and a length between about three inches and ten inches. Outside of housing 60, catheter tubing 152 may be coupled to a tube (not shown) having a larger bore, for example, about one-quarter inch, for leading the brine to a drain or a container. A disc of porous material 154 may be provided for preventing solids or sediments from reaching space 146 and blocking tubing 152.

The invention has been described in terms of embodiments thereof which may be attached directly to a domestic water supply and readily installed and reconfigured by a person not having specific plumbing skills or special tools. The embodiments rely on the availability of a source of water under pressure.

Figure 7:
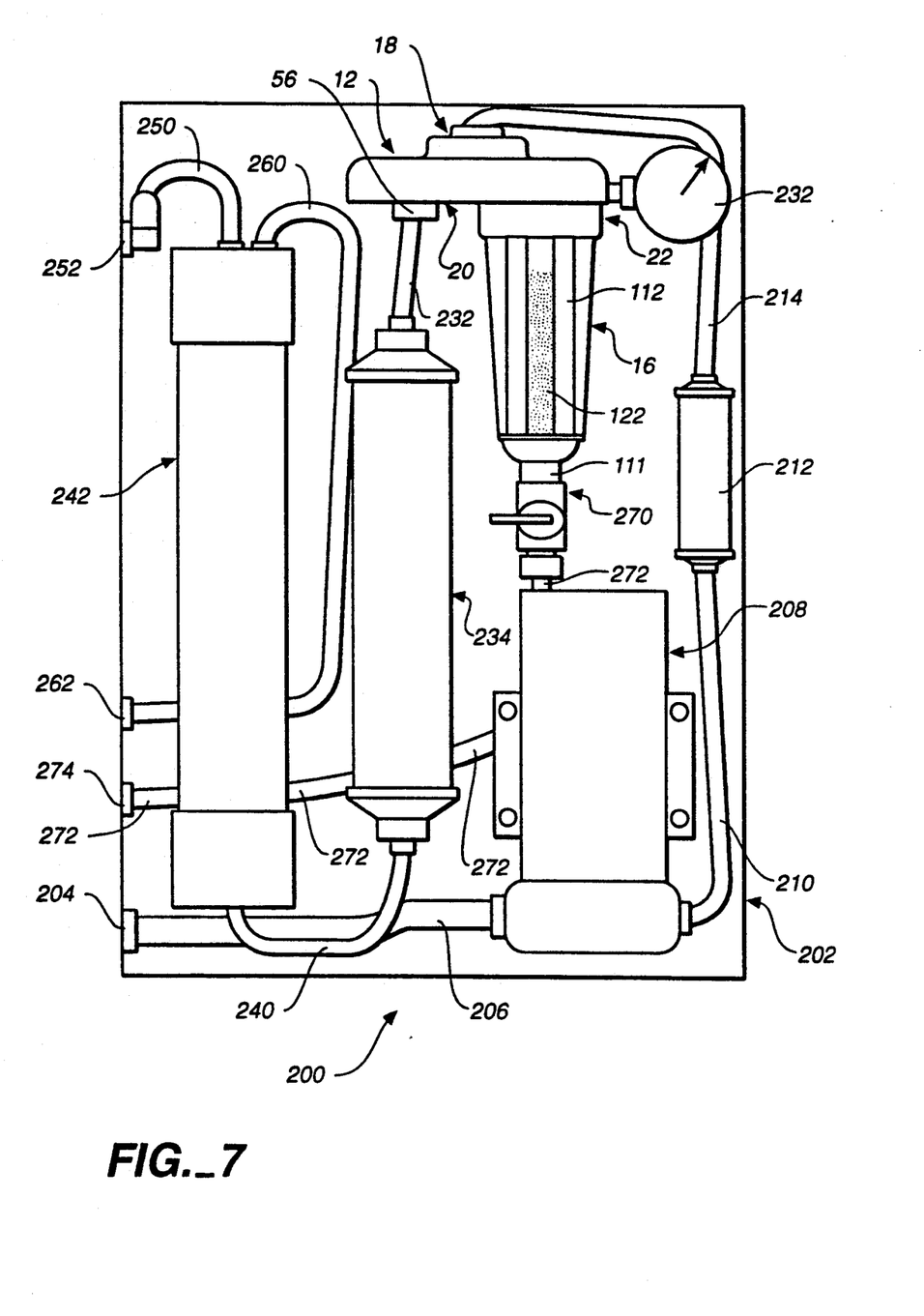
FIG. 7 schematically illustrates a system according to the present invention including a booster pump.

Turning now to FIG. 7, a system 200 of the present invention is illustrated which may be operated independent of the availability of a pressured water source. System 200 may be configured using larger treatment units for higher throughput capacity. System 200 is conveniently contained in a housing to which components and treatment units may be attached. An input port 204 is provided for source water. Port 204 is connected by a conduit 206 to a pump 208 for drawing water for a source and urging water through system 200. Pump 208 may be, for example, a three stage diaphragm pressure pump providing water at a pressure of between about 50 and 100 p.s.i. Of course, should a pressured source be available pump 208 may be omitted from system 200. Water from pump 208 is urged through conduit 210 to sediment filter 212 for removing fine suspended contaminants. Water from sediment filter 212 is urged through conduit 214, via an input port 215, into a turbidity/biocidal filter coupling unit 12. The coupling unit 12 previously described (FIGS. 1, 2, 3, and 5) may be conveniently employed in system 200. It may be mounted directly on housing 202. Water from conduit 214 is delivered to input port 18 from where it may be passed through a turbidity/biocidal treatment unit 16 to spigot 56, or may be passed directly to spigot as previously described (see FIG. 2) when unit 16 is not attached to attachment point 22. A pressure gauge 232 for monitoring system pressure may be attached to either of bores 32 or 50 (see FIG. 5) in place of plug 36.

A conduit 232 delivers water from spigot 56 to a treatment unit 234 wherein it is first treated in a granular metal alloy treatment chamber, including an arrangement of slots and fins, similar to the arrangement shown in FIG. 4, for producing turbulent flow agitation of the granular metal alloy. The water is then passed through a second chamber containing activated carbon (not shown). Granular metal alloy/carbon treated water is then urged through conduit 240 into a reverse osmosis filter treatment unit 242. Reverse osmosis treatment unit 242 includes a reverse osmosis membrane filter comprising multiple layers of reverse osmosis membrane material wrapped around a central hollow core as described above for system 11. Treated water is urged up the hollow core for output through conduit 250 to port 252. Brine rejected by the reverse osmosis filter is urged upwards and is removed through conduit 260 to port 262.

A flush port 274 for treatment unit 16 is provided. Flush port 274 is connected by a conduit 272 and a valve 270 to port 111.

A reverse osmosis filter, as previously described, rejects more brine than it passes purified water. This may be a serious problem if a system including reverse osmosis filtering is used in a region where water, of any kind, is scarce. In such a situation brine may be collected from port 262 and stored in a container (not shown) and recycled through system 200 for further extracting purified water therefrom. As illustrated in FIG. 7, brine 280 may be continuously recycled by returning all or some portion of the brine collected from port 106 into an intermediate reservoir 282 containing source water 284 to be treated.

It will be evident that in any of the above described embodiments, a mesh filter screen may be included for removing relatively coarse particulate matter from source water. Such a filter may be included, for example, at input port 18 of coupling unit 12 or at input port 204 of system 200.

A water purifying system has been described including multiple stages of filtering for removing organic and inorganic contaminants from source water. The system includes an optional capability for providing biocidal treatment of biologically contaminated water. The system includes a coupling unit, and first and second treatment units. The first treatment unit may contain granular metal alloy material effective in removing iodides from water. The second treatment unit may contain a biocidal resin including polyiodides. The coupling unit is configured such that when a second treatment is attached, water passes through the second treatment unit before being passed into the first treatment unit. As such, iodides released into the water by the biocidal resin are removed from the water by granular metal alloy material and activated carbon in the first treatment unit. A biocidal treatment of water before it is passed through a carbon filter kills biological contaminants which may otherwise breed and multiply if trapped in the carbon filter.

The present invention has been described in terms of a preferred and other embodiments. The invention is not limited, however, by the embodiments described and depicted. Rather the invention is defined by the appended claims.

What is claimed is:

1. An apparatus for treating water, comprising:
   a housing including generally cylindrical coaxial first and second chambers separated by a partition, said first chamber having a cylindrical wall;
   input means for passing source water into said first chamber, said input means including a tubular member extending coaxially into said first chamber from one end thereof, said tubular member having an upper portion and a lower portion;
   said first chamber including granular metal alloy material and means for agitating said granular metal alloy material;
   said agitation means including at least one angled slot located in said lower portion of said tubular member, said angled slot arranged to direct water in a generally circular path around said first chamber;
   said second chamber having an annular cylindrical first subchamber surrounding a cylindrical second subchamber, said first subchamber including a filter;
   means for providing a fluid connection for allowing water to pass from said first chamber into said second subchamber through said filter; and
   output means for delivering water from said second subchamber.

2. The apparatus of claim 1 wherein said filter includes compacted activated carbon.

3. The apparatus of claim 1 wherein said filter is a reverse osmosis filter.

4. The apparatus of claim 3 wherein said second subchamber includes activated carbon.

5. The apparatus of claim 4 further including means for removing brine rejected by said reverse osmosis filter.

6. The apparatus of claim 5 wherein said brine removing means includes a tube extending into said second chamber through a base thereof, said tube having a predetermined bore and a predetermined length for controlling brine removal rate.

7. The apparatus of claim 1 wherein said input means includes said tubular member having said upper portion joined to the top of said first chamber.

8. The apparatus of claim 1 wherein said agitation means further includes a plurality of fin members extending between said upper portion of said tubular member and said cylindrical wall.

9. The apparatus of claim 1 wherein said housing is attached to a coupling unit, said coupling unit including means for attaching a biocidal filter stage, and said coupling unit arranged such that source water is passed through said biocidal filter stage before it is passed into said first chamber.

10. The apparatus of claim 9 further including a biocidal filter stage attached to said coupling unit.

11. The apparatus of claim 10 wherein said biocidal filter stage includes a polyiodide material.

* * * * *